July 22, 1958  R. E. SEELY ET AL  2,844,778
PROTECTIVE ARRANGEMENT FOR STATOR MOTORS
Filed Sept. 12, 1957  2 Sheets-Sheet 1

Inventors:
Richard E. Seely,
Marvin E. Snyder,
by
Their Attorney.

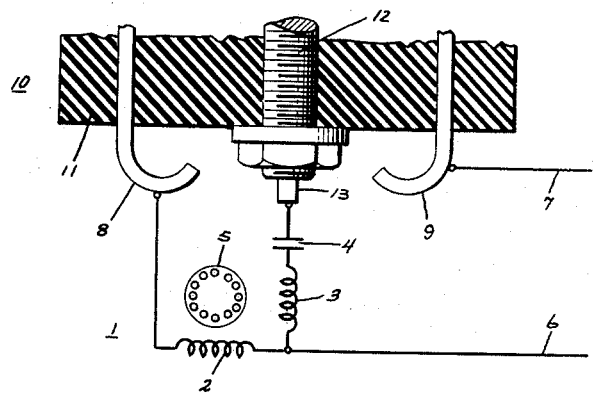
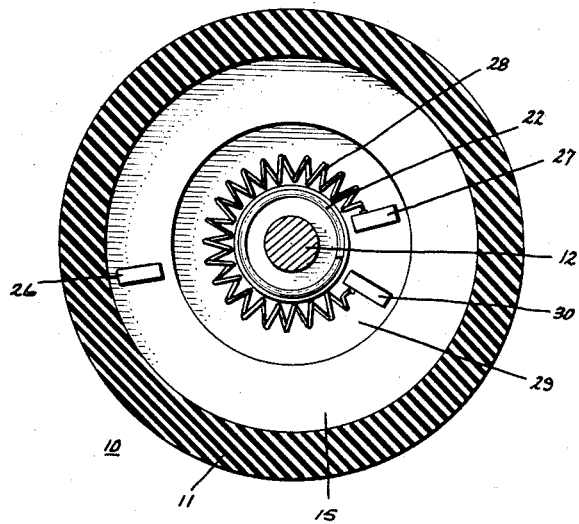

United States Patent Office 2,844,778
Patented July 22, 1958

2,844,778

PROTECTIVE ARRANGEMENT FOR STATOR MOTORS

Richard E. Seely, Fort Wayne, and Marvin E. Snyder, Kendallville, Ind., assignors to General Electric Company, a corporation of New York Application September 12, 1957, Serial No. 683,618

9 Claims. (Cl. 318—221)

This invention relates to protective arrangements for dynamoelectric machines, and more particularly to a protective arrangement for motors of the induction type where the function of the motor is to effect operation of another device for a limited period, usually for starting purposes.

It has been known for many years to use electric motors for the starting of other devices such as, for instance, gasoline motors. In the past, this has been primarily confined to the larger types of internal combustion engines, such as, for instance, those provided in automobiles. However, in order to avoid the inconvenience of having to turn the engine over manually until starting is effected, the use of electric motors for starting purposes is becoming common even in the case of relatively small internal combustion engines such as those used in lawnmowers and the like. Where the motor is to start a relatively small engine, such as the type used to power lawnmowers, it is necessary that the dimensions of the electric motor to effect the starting be maintained within strict limits. At the same time, in order to turn the engine over rapidly to ensure starting, it is necessary that the motor provide a high torque during the brief interval for which it is used. The combination of the limitation of space and the high torque required for the motor to perform its function limits the motor design to the extent that if such a motor is operated for more than the expected brief starting period, permanent damage to the motor windings may result. Since a switch must be provided for the operator to effect starting, the problem arises that the switch must not remain closed long enough for permanent harm to result to the motor even if the operator should maintain the switch closed for a longer period than necessary. In order to effect this, it is proposed to provide protective means for the motor in the switch itself so that when the operator starts the electric motor he also completes the circuit through a protective device which, at the end of a predetermined period, opens the motor circuit regardless whether the operator is still trying to maintain the switch closed.

It is therefore an object of this invention to provide, in combination with an electric starting motor, protective means built into a switch so that closure thereof by an operator cannot maintain the motor circuits closed for more than a predetermined period regardless of the position of the switch.

A further object of the invention is to provide a switch member with protective means incorporated therein so as to cause the switch to be open under the predetermined conditions even when the switch is manually maintained in its closed position.

In one aspect thereof, the invention provides a switch which includes a member movable manually from a first position to a second position, with spring means biasing the manually movable member to its first position. A bimetallic element is secured to move with the manually movable member and has a contact secured thereon in electrical contact therewith. The bimetallic element is deformable from a first shape below a predetermined temperature to a second shape above the predetermined temperature. A stationary contact is provided in the switch, and is arranged to be in electrical engagement with the bimetallic element contact when the manually movable member is in its second position with the element having its first shape. The contacts are, however, separated both when the manually movable member is in its first position and when the manually movable member is in its second position with the element having its second shape. The securement of the element to the manually movable member in this manner provides for motor protection regardless of manual operation of the switch for any electric induction-type motor having its windings connected at one end to the stationary contact. One possible alternative is to connect the motor windings to separate stationary contacts so that, when the motor is disconnected, the windings thereof are also disconnected from each other to prevent the formation of a regenerative braking circuit.

The features of the invention which are believed to be novel are set forth with particularity in the appended claims. The invention itself, however, both as to its organization and method of operation together with further objects and advantages thereof, may best be understood by reference to the following description taken in connection with the accompanying drawings.

In the drawings,

Figure 3 is a view along line 3—3 in Figure 2; and

Figure 4 is a fragmentary cross sectional view of the improved switch of this invention showing an alternative method of connecting the motor windings to the switch.

Figure 1:
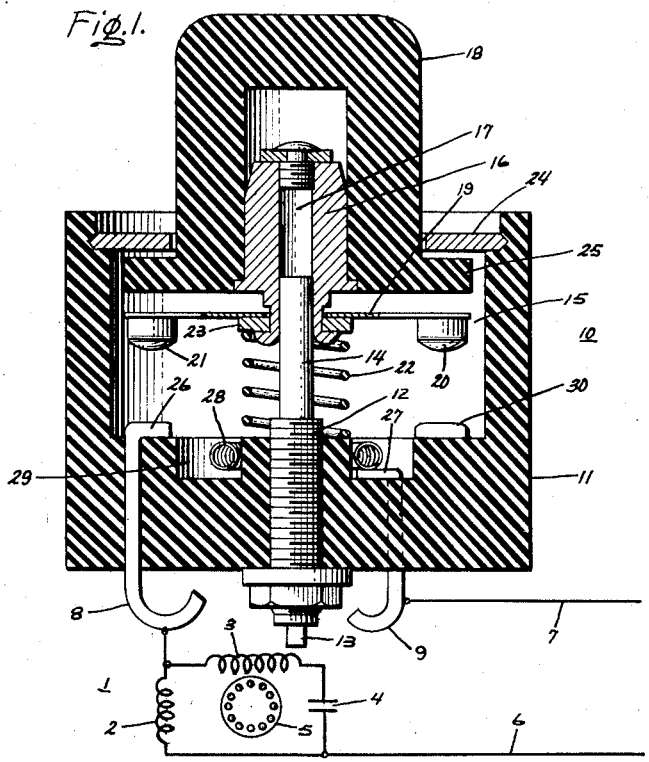
Figure 1 is a cross sectional view of the improved switch of this invention connected to an electric motor to provide protection therefor.

Referring now to Figures 1 and 4 of the drawing, there is shown in schematic form an induction-type motor, generally indicated at 1, having a main winding 2 and an auxiliary winding 3 which are displaced in phase from each other by some suitable device such as capacitor 4 and which are permanently connected in parallel as shown. Motor 1 is also provided in the usual manner with a conventionally constructed rotor 5. The motor is intended to be connected across a source of power (not shown) through a pair of lines 6 and 7 which are connected to terminals 8 and 9 of a switch generally indicated at 10, the line 7 being connected directly to the terminal 9 and the line 6 being connected to the terminal 8 through the motor.

Terminals 8 and 9 are secured in the switch housing 11 which is formed of insulating material. A metallic bolt 12 secured within the housing, preferably terminating in a third terminal 13 at its outer end, forms at its inner end a guide stem 14 which in turn extends into recess 15 formed by housing 11. A member 16 is provided with an internal tubular opening 17 so that it is adapted to move rectilinearly up and down on guide stem 14. Secured to member 16 is a manually operable push-button 18 of suitable insulating material. Also secured to member 16 so as to be movable therewith, together with push-button 18, is a bimetallic element 19 of a type well known in the art. Element 19 is provided in this case with contacts 20 and 21 which are mechanically and electrically secured to the bimetallic element at points remote from its point of securement to member 16.

A helical spring 22 positioned around guide stem 14 has one end in engagement with the housing 11 and the other bearing against member 16 through flange 23 so as to bias the push-button 18 to the outward position shown in Figure 1. A plate member 24 may be secured in housing 11 as shown. When push button 18 is provided with a peripheral flange 25, engagement of the flange with plate 24 limits the outward movement of the push-button in response to spring 22.

Terminal 8 extends through housing 11, as shown, to a stationary contact 26. In similar fashion terminal 9 extends up through housing 11 and has its upper end 27 secured to a heating coil 28 which is seated in annular recess 29 of housing 11. The other end of coil 28 is secured to a second stationary contact 30. For a purpose which will be more apparent in connection with the embodiment of Figure 4, terminal 13 is generally electrically engaged with bimetallic element 19; this may be satisfactorily effected, for instance, through the engagement of metal parts 12, 14, 16, 23, and 19.

Figure 2:
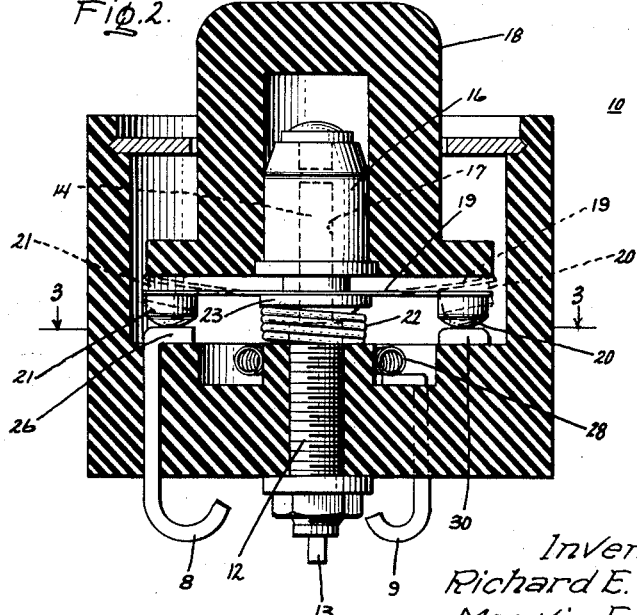
Figure 2 illustrates the same cross sectional view of the switch as Figure 1, with the manually movable member of the switch moved to its closed position.

Referring now to Figure 2, the switch construction is shown with the push-button 18 depressed against the action of spring 22. This pushes contacts 21 and 20 down into engagement with stationary contacts 26 and 30 respectively. As is well known, when the bimetallic element 19 is heated to a predetermined temperature it will suddenly change its shape to that shown in dotted outline. This causes contacts 21 and 20 to move away from contacts 26 and 30 respectively so that, although the push-button 18 is depressed, the contacts are separated. The heat for the bimetallic element to rise to the predetermined temperature is provided by the windings 2 and 3 of motor 1, in addition to heating of the bimetallic element itself due to the action of the current. The heating element 28 may also be provided so as to make possible any desired rate of heating of element 19 to the critical temperature.

The operation of the motor and switch of Figures 1 and 2 will now be explained. The switch is normally in its first, or outer, position shown in Figure 1; in this position the circuit through motor 1 is open. When the push-button 18 is depressed to its second, or inner, position, as in Figure 2, the bimetallic element and contacts 21 and 20 bridge contacts 26 and 30; this completes a circuit from line 6, through the motor to terminal 8, and then from contact 26 through bimetal 19 to contact 30, heating coil 28, terminal 9 and line 7. With this connection, the motor 1 then operates to start whatever device it is connected to. As has been explained, the windings 2 and 3 are very high torque windings but, because of the space and design limitations, are in danger of being permanently damaged by operation for more than a very short period. They draw a relatively high current which rapidly heats element 19 up to its critical temperature so that within a short period it snaps to the position shown in dotted outline in Figure 2. Thus, in the second position of push-button 18, regardless of the fact that the operator is attempting to complete the circuit, the bimetal causes the circuit to be nonetheless open. This provides inherent protection for the motor regardless of any tendency on the part of the operator to maintain the switch in its manually closed position for too long a period.

Referring now to Figure 4, a second embodiment of the invention will be described using like numerals for like parts. In this arrangement, instead of having both windings 2 and 3 of motor 1 connected to terminal 8, winding 2 is connected to terminal 8 while winding 3 is connected to terminal 13. With this connection, when the bimetal opens not only will motor 1 be disconnected from across the source of power but also there will be no closed circuit including windings 2 and 3. This prevents any danger of regenerative braking such as might be present for some motor designs with the arrangement of Figure 1.

With the arrangement shown in Figure 4, the current of both windings affects heater 28. However, it will be readily apparent that the connections of windings 2 and 3 and of line 7 to terminals 8, 9 and 13 may be varied to the extent of the number of combinations possible (six in this case), and that for each combination a different heating rate of bimetallic element 19 will be provided. Thus the construction of Figure 4, where all three terminals of switch 10 are used and a heating coil 28 is included, provides a wide variety of heating rates for any given bimetallic element and heating element.

It is clear from the above description that the construction permits use of a high torque motor which may be used without any fear that manual operation will cause the motor to run for a longer period than is appropriate.

While the invention has been explained by describing particular embodiments thereof, it will be apparent that improvements and modifications may be made without departing from the scope of the invention as defined in the appended claims.

What we claim as new and desire to secure by Letters Patent of the United States is:

1. A switch comprising a member movable manually from a first position to a second position, spring means biasing said manually movable member to said first position, a bimetallic element secured to move with said manually movable member and having a contact secured thereon in electrical contact therewith, said element being deformable from a first shape below a predetermined temperature to a second shape above the predetermined temperature, and a stationary contact, said contacts being in electrical engagement when said manually movable member is in said second position with said element having said first shape, said contacts being separated when said manually movable member is in said first position and when said manually movable member is in said second position with said element having said second shape.

2. An electric induction-type motor having main and auxiliary windings permanently connected in parallel and displaced in phase, said windings being designed to effect high torque starting; and a switch comprising a member movable manually from a first position to a second position, spring means biasing said manually movable member to said first position, a bimetallic element secured to move with said manually movable member and having a contact secured thereon in electrical contact therewith, said element being deformable from a first shape below a predetermined temperature to a second shape above the predetermined temperature, and a stationary contact, said contacts being in electrical engagement when said manually movable member is in said second position with said element having said first shape, said contacts being separated when said manually movable member is in said first position and when said manually movable member is in said second position with said element having said second shape; said windings being connected at one end to said stationary contact.

3. A switch comprising a member movable manually from a first position to a second position, spring means biasing said manually movable member to said first position, a bimetallic element secured to move with said manually movable member and having a pair of spaced contacts secured thereon in electrical contact therewith, said element being deformable from a first shape below a predetermined temperature to a second shape above the predetermined temperature, a pair of stationary contacts, a pair of terminals respectively secured to said stationary contacts, a third terminal permanently electrically secured to said bimetallic element, said element contacts being respectively in electrical engagement with said stationary contacts when said manually movable member is in said second position with said element having said first shape, said element contacts being separated from said stationary contacts respectively when said manually movable member is in said first position and when said manually movable member is in said second position with said element having said second shape.

4. An electric induction-type motor having main and auxiliary windings permanently connected in parallel and displaced in phase, said windings being designed to effect high torque starting; and a switch comprising a member movable manually from a first position to a second position, spring means biasing said manually movable member to said first position, a bimetallic element secured to move with said manually movable member and having a pair of spaced contacts secured thereon in electrical contact therewith, said element being deformable from a first shape below a predetermined temperature to a second shape above the predetermined temperature, a pair of stationary contacts, a heating coil connected to the first of said stationary contacts, a first terminal connected to said heating coil, a second terminal connected to the second of said stationary contacts, and a third terminal permanently connected to said bimetallic element, said element contacts and said stationary contacts being respectively in electrical engagement when said manually movable member is in said second position with said element having said first shape, said element contacts and said stationary contacts being respectively separated when said manually movable member is in said first position and when said manually movable member is in said second position with said element having said second shape; one of said windings being connected to one of said terminals and the other of said windings being connected to a second of said terminals.

5. A switch comprising a member movable manually from a first position to a second position, spring means biasing said manually movable member to said first position, a bimetallic element secured to move with said manually movable member and having a contact secured thereon in electrical contact therewith, said element being deformable from a first shape below a predetermined temperature to a second shape above the predetermined temperature, a heating coil connected in series with said bimetallic element, and a stationary contact, said contacts being in electrical engagement when said manually movable member is in said second position with said element having said first shape, said contacts being separated when said manually movable member is in said first position and when said manually movable member is in said second position with said element having said second shape.

6. A switch comprising an insulating housing having a recess formed therein, a push-button rectilinearly movable from a first position substantially withdrawn from said recess to a second position within said recess, spring means biasing said push-button to said outer position, a bimetallic disc secured to said push-button to move therewith and having a pair of contacts secured thereon in electrical contact therewith on opposite sides of said push-button, said disc being deformable from a first shape below a predetermined temperature to a second shape above the predetermined temperature, a pair of stationary contacts positioned within said recess, said disc contacts being in electrical engagement with said stationary contacts respectively when said push-button is in said second position with said disc having said first shape, said disc contacts being separated respectively from said stationary contacts when said push-button is in said first position and when said push-button is in said inner position with said disc having said second shape.

7. A switch comprising a housing of insulating material having a recess formed therein, a push-button rectilinearly movable from a first outer position to a second inner position within said recess, spring means biasing said push-button to said outer position, a bimetallic disc secured substantially centrally thereof to said push-button to move therewith and having a pair of contacts secured thereon in electrical contact therewith on opposite sides of said push-button, said disc being deformable from a first shape below a predetermined temperature to a second shape above the predetermined temperature, a pair of stationary contacts secured within said housing recess a heating coil connected in series with one of said stationary contacts, a first terminal connected to said heating coil and said first stationary contact, a second terminal connected to said second stationary contact, and a third terminal connected to said bimetallic disc, said disc contacts and said stationary contacts being in electrical engagement when said push-button is in said inner position with said disc having said first shape, said disc contacts being separated from said stationary contacts respectively when said push-button is in said outer position and when said push-button is in said inner position with said disc having said second shape.

8. The combination of claim 1 including a housing mounting said manually movable member and surrounding said bimetallic element, a heater disposed in said housing in heat transfer relationship with said bimetallic element, and electrical connection means connecting said heater in series with one of said contacts whereby said heater is operative to heat said bimetallic element whenever said contacts are closed.

9. The combination of claim 1 including means completing an electrical circuit through said bimetallic element whenever said contacts are in engagement, whereby said bimetallic element is heated by the passage of current therethrough.

No references cited.

UNITED STATES PATENT OFFICE

CERTIFICATE OF CORRECTION

Patent No. 2,844,778　　　　　　　　　　　　　　　　　　　July 22, 1958

Richard E. Seely et al.

It is hereby certified that error appears in the above numbered patent requiring correction and that the said Letters Patent should read as corrected below.

In the heading to the drawings, Sheets 1 and 2, line 2, and in the heading to the printed specification, line 2, in the title of invention, for "STATOR" read -- STARTER --.

Signed and sealed this 24th day of February 1959.

(SEAL)
Attest:

KARL H. AXLINE　　　　　　　　　　　　　　　　　　ROBERT C. WATSON
Attesting Officer　　　　　　　　　　　　　　　　　Commissioner of Patents